Dec. 21, 1937.  L. C. BROECKER ET AL  2,103,108
PNEUMATIC VALVE
Original Filed Dec. 29, 1932    2 Sheets-Sheet 1

INVENTOR
Lewis C. Broecker &
BY John Ferguson
Prindle, Bean & Mann
ATTORNEY

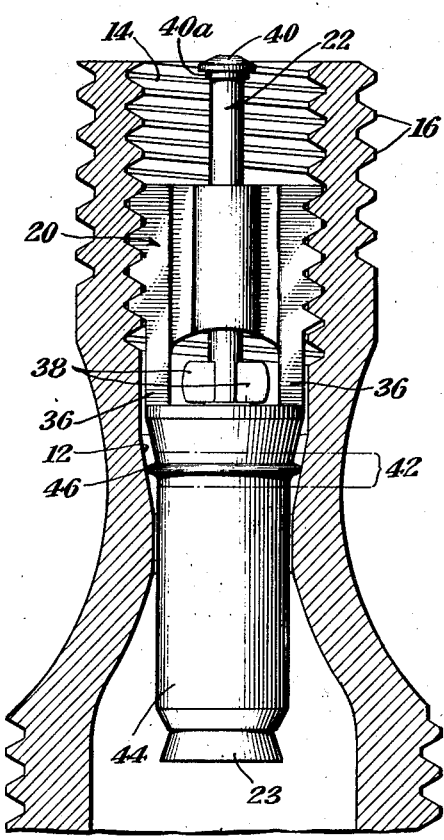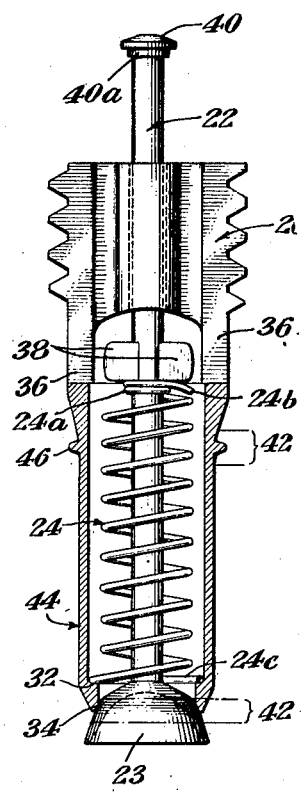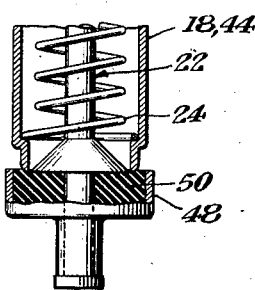

Patented Dec. 21, 1937

2,103,108

UNITED STATES PATENT OFFICE 2,103,108

PNEUMATIC VALVE

Lewis C. Broecker, Bridgeport, and John Ferguson, Southbury, Conn., assignors to Bridgeport Brass Company, Bridgeport, Conn., a corporation of Connecticut Application December 29, 1932, Serial No. 649,254
Renewed May 18, 1937

15 Claims. (Cl. 152—12)

This invention relates to improvements in pneumatic valves including tire valves. Its objects are to secure effective operation, simplicity in manufacturing and assembling, prevention of deterioration and leakage with age and use, as well as other objects.

In the drawings which illustrate two embodiments of the invention:

Figs. 5 and 6 are views similar to Figs. 1 and 2, but illustrating another embodiment of the invention differing as to the barrel element of the valve insides.

Fig. 7 is a detail of a variant form of valve insides construction.

The same numerals have been used in all the views to designate the same parts.

Figure 1:
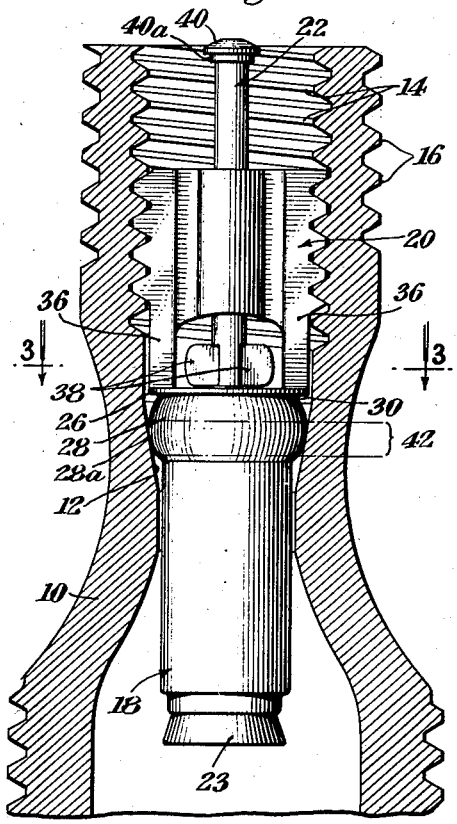
Fig. 1 shows a valve insides and a valve stem within my invention, much magnified, partly in elevation and partly in vertical section.

Referring now to the embodiment of my invention illustrated in Figs. 1 to 4 inclusive, 10 designates a hollow valve stem having an internal taper seat 12. Fig. 1 shows only the upper end of the stem having the usual internal screw-threads 14 and external screw-threads 16.

The usual cap not shown engages the external screw-threads for closing the upper end of the stem. The stem may be made by machining it from a metal rod or it may be drawn from a sheet metal blank, and thereafter screw-threaded and otherwise machined where necessary.

Figure 2:
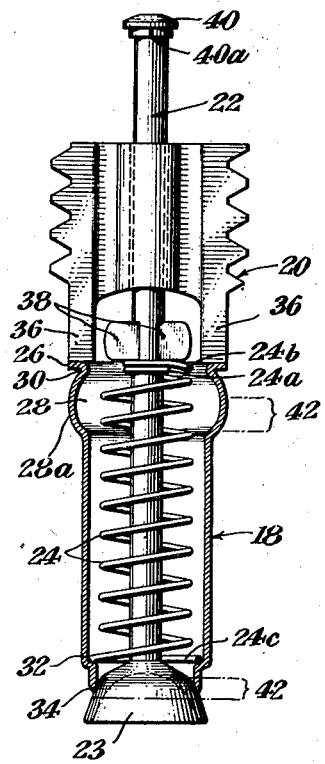
Fig. 2 shows the valve insides of Fig. 1 removed from the stem, the figure being partly in elevation and partly in vertical section.
Figure 3:
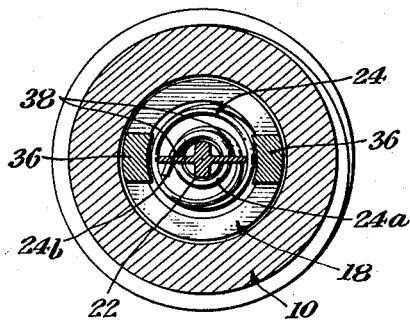
Fig. 3 is a horizontal section on the line 3—3 in Fig. 1 looking downwardly.

The valve "insides" or valve core consists of the self-contained unit shown in Fig. 2 made up of four parts, namely a barrel 18, a screw plug 20, a center pin 22, and a helical spring 24. The barrel is tubular and may be drawn from thin sheet metal and has an outwardly directed flange 26 at its upper end. The barrel is formed with an annular outwardly projecting corrugation 28 separated by an annular space 30 from the flange. This corrugation has a substantially abrupt shoulder 28a for engaging the taper seat 12 in the valve stem. The lower end of the barrel is contracted to form an internal shoulder 32 to serve as the lower abutment for the helical spring 24. Below this the lower end of the barrel is formed into an annular valve seat 34.

The screw plug 20 is a somewhat thick rectangular piece of metal, screw-threaded at its side edges, to engage the internal screw-threads 14 in the valve stem. An axial hole in the plug receives the center pin 22 freely through it. Finally the plug has two integral legs 36 extending downwardly on opposite sides of the center pin to bear against the flanged upper end of the barrel.

The center pin 22 is a round metal rod extending through the barrel and the hole in the plug. The lower end of the pin is provided with a conical or hemispherical valve, in other words, with a taper plug valve 23 cooperative with the annular valve seat 34 at the bottom of the barrel.

Surrounding the pin within the barrel is the helical spring 24 compressed between the internal shoulder 32 of the barrel and an abutment 38 on the pin at its middle portion whereby the valve is normally spring-held against its seat. The latter abutment 38 preferably consists as shown of two opposed ears or lugs pinched out laterally from the material of the pin.

At the top, the spring ends in a small circular coil or coils 24a commensurate with the cross section of the rod. The end 24b of the wire, from which the spring is made, is turned down away from the abutment ears or lugs so as to prevent it from catching thereon and becoming bent, in case the center pin turns about its axis. At its bottom, the helical spring ends in a large circular coil 24c fitting the inside of the barrel and resting upon the internal spring-abutment or shoulder 32.

The upper end of the center pin 32 extends well above the screw plug 20 where it is upset to form a head 40 which has a larger diameter than the hole in the plug.

To assemble the four parts of the barrel into a unitary structure as shown in Fig. 2, the following method may be employed. The center pin 22 is inserted upwardly through the barrel, it being understood that the head 40 and the ears 38 have not yet been formed on the pin. The previously formed helical spring 24 is then dropped down over the pin into the barrel to seat its large bottom coil upon the abutment 32. The spring is then suitably compressed, whereupon the ears 38 are formed on the center pin by a suitable tool to form the upper abutment for the spring. The screw plug 20 is then inserted on the pin, after which the head 40 is upset and formed on the upper end of the pin. This assembles the four parts into a self-contained unitary valve "insides" insertible into the valve stem as shown in Fig. 1 with the shoulder 28a of the barrel engaging the taper seat 12 in the valve stem and with the plug 20 in screw-threaded engagement with the internal threads 14 of the valve stem. The plug is then screwed down against the flanged upper end of the barrel sufficiently to force the shoulder into tight all-around conformity with the taper seat. There is enough yieldingness to this portion of the barrel to form a tight seating between it and the taper seat of the valve stem; and there is enough springiness in the portions connecting same with the flange to resiliently maintain the tightness of said seat.

The barrel is drawn from sheet metal with the aforesaid shoulder 28a preferably made as sharp or abrupt as possible. When the barrel is seated into the stem, this shoulder contacts with the tapered seat of the stem. The pressure exerted by the screw plug on the barrel is concentrated on this shoulder, causing it to conform to the shape of the seat to form an air-tight contact between the barrel and the tapered seat of the stem. As the metal from which the barrel is made is quite thin, it will readily conform to the shape of the tapered seat, even though the seat should be slightly oval.

The fact that the flange 26 is spaced from the annular corrugation 28 and its shoulder 28a, gives a resiliency to the upper portion of the barrel structure so that it will yield a certain amount when the screw plug is tightened down on it, but tends to assume its original shape if the pressure be relaxed. This resiliency is augmented by the fact that the metal is cold worked during the drawing and forming operation, thereby making the metal itself quite springy. The importance of this resiliency is that it prevents the joint made between the shoulder of the barrel and the tapered seat in the valve stem from loosening and leaking due to vibration, or expansion and contraction caused by temperature changes, etc.

The tubular barrel 18 being drawn from thin sheet-metal as previously explained, it follows that the properties of yieldingness and resilient flexibility described as being possessed by the flanged and corrugated portions also inhere in the rest of the barrel, including the annular seat 34 which is thereby rendered all the more suitable for close fitting air-tight cooperation with the plug valve 23.

As an additional means to insure an air-tight seating between the annular corrugation 28 and the taper seat in the valve stem, and between the taper plug valve 23 and its annular seat 34, we provide the coacting parts with a soft metal coating 42, as for example with a thin coating of a soft lead-tin alloy. This coating may be applied in any desired or preferred manner to the shoulder portion 28a of the barrel and/or to the taper seat 12 in the sleeve. Also it may be applied to the taper sides of the valve 23 and/or to the valve seat 34. These soft metal coatings are thick enough so as to readily conform on application of pressure to the parts whereby air tight seatings are secured between the parts. Furthermore, these soft metal coatings fill out any minute imperfections that may exist in the surface of the tapered seat 12 when the shoulder is forced against the seat. The same applies to the soft coatings on the conical plug valve and its valve seat. To facilitate the application of the pressure on the valve necessary to smooth and conform the contact surfaces between the valve and its seat, the head of the center pin is provided with the shoulder 40a. This permits the use of an air chuck provided with the insert described in our copending application covering springless valve insides, Ser. No. 614,116, filed May 28th, 1932. The pressure exerted on the plug valve and its coacting seat by using this type of air chuck is ample to smooth and conform the contact surfaces.

Figure 4:
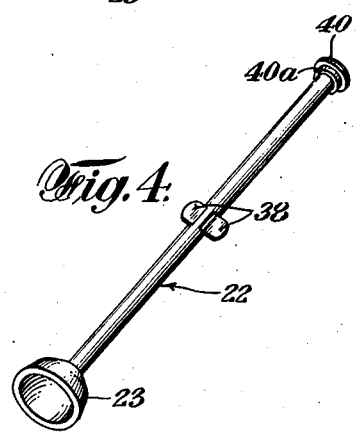
Fig. 4 is a perspective view of the center pin detached.

It will be seen that the plug valve 23 is not only integral with the center pin 22 but that it is hollow as shown in Fig. 4. It is made by upsetting and forming the lower end of the center pin into the hollow hemispherical or conical shape shown. This imparts desirable, advantageous lightness to the movable part of the valve insides, namely to the valve and the supporting center pin.

The second embodiment is shown in Figs. 5 and 6 and differs from the first embodiment only as to the barrel of the valve insides. Accordingly the foregoing description as to the first embodiment applies in all other respects to the second embodiment. In this latter, the barrel 44 may be turned out of rod-stock and is formed externally with a thin annular rib 46 positioned to engage the taper seat 12 in the valve stem. When the plug 20 is screwed down hard against the upper end of the barrel, the pressure is concentrated on the edge of the aforesaid annular rib 46 in engagement with the taper seat whereby said edge is caused to shape itself into air-tight conformity with said seat.

As in connection with the other embodiment and as an additional means for insuring an air-tight seating between the rib 46 and the taper seat in the valve stem, we provide the coacting parts with a readily conformable soft metal coating or coatings 42.

In addition to the advantages inherent in an internal-spring type of valve insides and inherent in valve stems cooperative therewith, it will be seen that our invention is adapted to provide an all-metal construction without rubber gaskets or a rubber valve and therefore not subject to deterioration and becoming leaky with age. For the same reason, it will not be affected by the high temperatures to which present day tires are subjected. Again the all-metal barrel will not stick like a rubber gasket to the inside of the valve stem and will not leave portions of the gasket within the valve stem which must be scraped off, usually resulting in irreparably damaging the stem. Any suitable soft metal coating may be used for the purpose instead of the suggested soft lead-tin alloy, provided it is thick enough to give the desired results. Thus, an excellent coating and method of applying it consists in applying a thin coating of lead to a limited area of the parts which includes the coacting zones 42 thereof; and then following this by a thin tin plating of the parts, preferably all over said parts, including the aforesaid leaded zone.

As shown in Fig. 7 the barrel 18 or 44, may be used with a center pin 22 having a cup member 48 on its lower end to receive the rubber washer or gasket 50, which forms a valve against which the annular valve seat 34 of the barrel fits. Of course other constructions of valve may also be used for this purpose.

It will be understood that the constructions herein shown and described in considerable detail are to be regarded as illustrating preferred embodiments, and not as limiting the invention to said details except as may be required by the appended claims interpreted in view of the prior art. Further, it will be understood that modifications, substitutions and omissions may be made in the illustrative embodiments which will nevertheless be within the scope and spirit of the invention and of the appended claims.

What we claim is:

1. In combination with a valve stem having an internal, tapered, annular seat; a valve insides comprising a tubular metal barrel whose side wall is outwardly bulged to form an outwardly projecting, annular, thin-walled corrugation at a zone thereof adapted to engage the tapered annular seat and become peripherally conformed thereto when the barrel is forced endwise in the valve stem.

2. In combination with a valve stem having an internal, tapered, annular seat; a valve insides comprising a thin-walled tubular metal barrel having a flange at its mouth, and having spaced below said flange an outwardly projecting thin-walled annular corrugation; the valve insides further comprising means acting on said flange to force and conform the annular corrugation of the barrel endwise into peripherally tight engagement with the tapered annular seat.

3. In combination with a valve stem having an internal, tapered, annular seat; a valve insides comprising a thin-walled tubular metal barrel having a flange at its mouth, and having spaced below said flange an outwardly projecting thin-walled annular corrugation; the valve insides further comprising means acting on said flange to force and conform the annular corrugation of the barrel endwise into peripherally tight engagement with the tapered annular seat; the flanged and the annular corrugation portions of the barrel being yielding and springy whereby the tight engagement between the parts is resiliently maintained.

4. In combination with a valve stem having an internal, tapered, annular seat; a valve insides comprising a tubular metal barrel having an outwardly projecting readily deformable annular rib adapted to be entered into peripherally tight engagement with the tapered annular seat.

5. In combination with a valve stem having an internal, tapered, annular seat; a valve insides comprising a tubular metal barrel having an outwardly projecting readily deformable annular rib adapted to be entered into peripherally tight engagement with the tapered annular seat, the contact portion of one or both of said parts having a yieldingly soft metallic coating.

6. A valve insides comprising a tubular barrel having a yielding annular valve-seat, a center pin extending axially through the barrel and having a taper plug-valve to cooperate with said seat, said seat and plug-valve having a yieldingly soft metallic coating on the contact portion of one or both of said parts.

7. In combination with a valve stem having an internal, tapered, annular seat; a thin-walled tubular metal barrel having a flange at its upper end, a plug-valve seat at its lower end, an outwardly projecting thin walled annular corrugation spaced below the flange, and an abutment for a helical spring within the barrel adjacent the wall thereof above the valve seat; a screw-plug operative within the valve stem upon the flange of the barrel to force and conform the annular corrugation into tight peripheral engagement with the tapered annular seat of the valve stem, said plug having an axial hole therethrough; a center pin extending freely through the barrel and the hole in the plug, said pin having a head on its upper end beyond the plug, and having a taper plug-valve on its lower end below and cooperative with the plug-valve seat, and having an abutment at its middle portion for the upper end of a helical spring; and said helical spring surrounding the pin in the barrel under compression between said abutments in the barrel and on the center pin.

8. In combination with a valve stem having an internal, tapered, annular seat; a thin walled metal barrel having an outwardly projecting thin-walled annular corrugation, a plug-valve seat at its lower end, an abutment for a helical spring within the barrel adjacent the wall thereof above the valve seat; a screw plug operative within the valve stem on the barrel to force and conform the annular corrugation into tight peripheral engagement with the tapered annular seat of the valve stem, said plug having an axial hole therethrough; a center pin extending freely through the barrel and the hole in the plug, said pin having a taper plug-valve on its lower end below and cooperative with the plug-valve seat, and having an abutment at the middle portion for the upper end of a helical spring; and said helical spring surrounding the pin in the barrel under compression between said abutments in the barrel and on the center pin.

9. A valve insides adapted for insertion and removal from the air passageway of a tire valve stem, comprising a barrel member having an air passageway therethrough, a valve for normally closing said air passageway in the barrel member, and said barrel member having integral therewith a peripheral bead which is deformable incident to the inserting of the valve core in the air passageway of the said stem for the purpose of forming an air-tight seal between the valve insides and the valve stem when in place in the valve stem, whereby the valve insides when thus assembled constitutes a valve controlled closure for the valve stem.

10. A metallic valve insides comprising a threaded plug and a barrel member having integral therewith a cylindrical metal skirt portion forming a resilient and flexible valve seat at the inner end of said skirt portion, a valve plunger adapted for movement to and from seating position on said valve seat, the resiliency and flexibility of the said valve seat enabling the same to accurately conform to the contour of said valve plunger and thereby effect an air-tight seal.

11. A metallic valve insides comprising a threaded plug portion and a cylindrical resilient skirt portion covered with a relatively soft metal adjacent its interior valve engaging end portion, a substantially conical valve plunger adapted for movement partially into and movement away from the said end of the skirt, the said valve plunger being of greater peripheral dimensions than the interior diameter of the said skirt which, due to its inherent characteristics, will accurately conform to the contour of the said valve plunger and form therewith an air-tight joint.

12. A metallic valve insides comprising a threaded plug portion and a cylindrical resilient metal skirt portion, the latter forming a resilient valve seat at the inner end of said skirt portion, a substantially conical valve plunger adapted for movement to and from seating position on said valve seat, the resiliency of the skirt portion enabling the said seat to accurately conform to the contour of said valve plunger and thereby effect an air-tight seal.

13. In a device of the class described, in combination, a tire valve stem having an opening therethrough for the passage of air, the outer end of said stem being internally threaded and being provided inwardly of said threaded portion with a tapered internal shoulder converging inwardly, a valve insides adapted to be received within said opening and comprising an externally threaded portion and a flexible metallic skirt portion, the former adapted to be threaded into the internally threaded portion of said stem, a guiding and sealing bead integral with said skirt portion and adapted to be wedgingly engaged against said tapered shoulder whereby to form a seal between said valve insides and said tire valve stem, the aforesaid flexible metallic skirt being located inwardly relatively to said bead and having an external diameter less than the internal diameter of said opening in the region which it occupies, and forming a resilient and flexible valve seat at its inner end; and a conical valve element having its apex extending into the seat for normally closing the inner end of said skirt.

14. In an all-metal tire valve assembly, in combination, a tire valve stem having an opening therethrough for the passage of air, the outer end of said stem being internally threaded and provided inwardly of said threaded portion with a tapered internal shoulder converging inwardly, a hollow metallic valve insides adapted to be received within said opening and comprising an externally threaded portion and a metallic skirt portion, the former adapted to be threaded into the internally threaded portion of said valve stem, a deflating pin extending through said valve insides, a guiding and sealing bead integral with said skirt portion and adapted to be wedgingly engaged against said tapered shoulder whereby to form a seal between said valve insides and said tire valve stem, the aforesaid metallic skirt being located inwardly relatively to said bead, and having an external diameter less than the internal diameter of said opening in the region which it occupies, the inner end of said skirt forming one valve element, a second valve element carried by said deflating pin and having a portion adapted to enter the lower end of said skirt, said second valve element having a maximum external diameter not greater than the external diameter of said skirt and having a tapered surface adapted to be engaged by said skirt in substantial line contact whereby to form a seal for the lower end of said skirt.

15. A tire valve insides comprising a barrel portion having a flexible annular metal valve seat at its inner end, a center pin operative within said barrel, and a plug valve on said pin cooperating with said seat, the flexibility of said seat enabling it to conform circumferentially to said plug valve when seated and thereby effect an air-tight seal.

LEWIS C. BROECKER.
JOHN FERGUSON.